US006497998B1

(12) United States Patent
Dontula et al.

(10) Patent No.: US 6,497,998 B1
(45) Date of Patent: Dec. 24, 2002

(54) ORIENTED POLYOLEFIN IMAGING ELEMENT WITH NACREOUS PIGMENT

(75) Inventors: Narasimharao Dontula, Rochester, NY (US); Robert P. Bourdelais, Pittsford, NY (US); Alphonse D. Camp, Rochester, NY (US); Peter T. Aylward, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/931,560

(22) Filed: Aug. 16, 2001

(51) Int. Cl.[7] .......................... G03C 1/795; G03C 1/79; G03C 1/765; G03C 1/93; G03C 8/52
(52) U.S. Cl. ...................... 430/496; 430/220; 430/510; 430/536; 430/961; 347/106
(58) Field of Search ............................. 430/11, 14, 220, 430/510, 523, 533, 536, 961, 496; 347/106

(56) References Cited

U.S. PATENT DOCUMENTS

| | | | |
|---|---|---|---|
| 4,216,018 A | 8/1980 | Bilofsky et al. | 430/220 |
| 4,269,916 A | 5/1981 | Bilofsky et al. | 430/220 |
| 4,288,524 A | 9/1981 | Bilofsky et al. | 430/220 |
| 4,579,810 A * | 4/1986 | Johnson et al. | 430/536 |
| 5,340,692 A | 8/1994 | Vermeulen et al. | 430/233 |
| 5,466,519 A | 11/1995 | Shirakura et al. | 430/538 |
| 5,733,658 A | 3/1998 | Schmid et al. | |
| 5,858,078 A | 1/1999 | Andes et al. | |
| 5,866,282 A | 2/1999 | Bourdelais et al. | 430/536 |
| 5,888,681 A | 3/1999 | Gula et al. | 430/536 |
| 6,030,759 A | 2/2000 | Gula et al. | 430/536 |
| 6,071,654 A | 6/2000 | Camp et al. | 430/536 |
| 6,071,680 A | 6/2000 | Bourdelais et al. | 430/536 |
| 6,146,744 A | 11/2000 | Freedman | 428/213 |
| 6,274,284 B1 * | 8/2001 | Aylward et al. | 430/536 |
| 6,291,551 B1 * | 9/2001 | Kniess et al. | 430/270.1 |

OTHER PUBLICATIONS

Derwent Abstr. of JP 61/259246, Fuchizawa et al., Nov. 1986.*
JPAB Abstr. of JP 61/259,246, Fuchizawa et al., Nov. 1986.*

* cited by examiner

Primary Examiner—Richard L. Schilling
(74) Attorney, Agent, or Firm—Paul A. Leipold

(57) ABSTRACT

The invention relates to an imaging element comprising at least one layer of oriented polyolefin and nacreous pigment.

16 Claims, 2 Drawing Sheets

ORIENTED POLYOLEFIN IMAGING ELEMENT WITH NACREOUS PIGMENT

FIELD OF THE INVENTION

This invention relates to imaging materials. In a preferred form, it relates to nacreous voided photographic reflective paper.

BACKGROUND OF THE INVENTION

Prior art reflective imaging output materials such as silver halide reflective images or inkjet reflective images typically comprise imaging layers applied to a white reflective base material. The white reflective base reflects ambient light back to the observer's eye to form the image in the brain. Prior art base materials typically utilize white reflecting pigments such as $TiO_2$ or barium sulfate in a polymer matrix to form a white reflective base material. Prior art reflective photographic papers also contain white pigments in the support just below the silver halide imaging layers to obtain image whiteness and sharpness during image exposure, as the white pigment reduces the amount exposure light energy scattered by the cellulose paper core. Details on the use of white pigments in highly loaded coextruded layers to obtain silver halide image sharpness and whiteness are recorded in U.S. Pat. No. 5,466,519.

In U.S. Pat. No. 6,146,744 (Freedman) high aspect ratio filler particles are added to composite facestock and liner sheets to provide increased mechanical stiffness compared to polymer facestock and liner materials that do not contain filler particles. While high aspect ratio filler particles added to the base layer in an amount between 5% to 40% by weight does improve the stiffness of the liner and facestock, the filler particles do not provide a nacreous appearance. Further, the high aspect ratio particles are added to the core of the facestock and liner and not to the printed layers. It has been shown that high aspect ratio particles added to the core of a facestock do not provide adequate multiple reflection planes in combination with a dye based imaging system to provide the desired nacreous appearance. High aspect ratio particles provide a nacreous appearance when they are located adjacent to the dye based imaging layers. Further, not attempt was made to improve the reflectivity of the high aspect ratio particles and thus are not suitable for the formation of photographic images.

It has been proposed in U.S. Pat. No. 5,866,282 (Bourdelais et al) to utilize a composite support material with laminated biaxially oriented polyolefin sheets as a photographic imaging material. In U.S. Pat. No. 5,866,282, biaxially oriented polyolefin sheets are extrusion laminated to cellulose paper to create a support for silver halide imaging layers. The biaxially oriented sheets described in U.S. Pat. No. 5,866,282 have a microvoided layer in combination with coextruded layers that contain white pigments such as $TiO_2$ above and below the microvoided layer. The composite imaging support structure described in U.S. Pat. No. 5,866,282 has been found to be more durable, sharper and brighter than prior art photographic paper imaging supports that use cast melt extruded polyethylene layers coated on cellulose paper.

It has been proposed in U.S. Pat. No. 6,071,680 (Bourdelais et al) to utilize a voided polyester sheet coated with light sensitive silver halide imaging layers for use as photographic output material. The voided layer in U.S. Pat. No. 6,071,680 improves opacity, image lightness, and image brightness compared to prior art polyethylene melt extrusion coated cellulose paper base materials. The image base proposed in U.S. Pat. No. 6,071,680 also contains an integral polyolefin skin layer to facilitate imaging layer adhesion at the time of manufacture and during the processing of silver halide imaging layers.

There, however, remains a continuing need for improvements to the appearance of imaging output materials. It has been shown that consumers, in addition to reflective output material, also prefer nacreous images. Nacreous images exhibit a pearly or nacreous luster, an iridescent play of colors, and a brilliant luster that appears in three dimensions. Nacreous appearance can be found in nature if one examines a pearl or the polished shell of Turbo marmoratus.

A nacreous photographic element with a microvoided sheet of opalescence is described in U.S. Pat. No. 5,888,681 (Gula et al). In U.S. Pat. No. 5,888,681 microvoided polymer sheets with microvoided polymer layer located between a cellulose paper base and developed silver halide imaging provide an image with an opalescence appearance. The nacreous appearance is created in U.S. Pat. No. 5,888,681 by providing multiple internal reflections in the voided layer of the polymer sheet. While the opalescence appearance is present in the image, the image suffers from a loss of image sharpness or acutance, a higher density minimum position, and a decrease in printing speed compared to a typical photographic image formed on a white, reflecting base. It would be desirable if the opalescent look of the image could be maintained while improving printing speed, increasing sharpness, and decreasing density minimum. Also, while the voided polymer does provide an excellent nacreous image, the voided layer, because it is pre-fractured, is subjected to permanent deformation, thus reducing the quality of the image.

In addition to the use of white pigments in reflective consumer photographs, white pigments are also utilized in photographic display materials for diffusion of illumination light source. While the use of white pigments in display materials does provide the desired diffusion and reflection properties, the white pigments tend to change the hue angle of the color dyes in a developed photographic display image. Dye hue angle is a measure in CIElab color space of that aspect of color vision that can be related to regions of the color spectrum. For color photographic systems there is a perceptual preferred dye hue angle for the yellow, magenta, and cyan dyes. It has been found that when photographic dyes are coated on support containing white pigments, the hue angle of the developed image changes compared to the hue angle of the dyes coated onto a transparent support. The hue angle change of photographic dyes caused by the presence of white pigments often reduces the perceived quality of the dyes compared to the dye set coated on a transparent base that is substantially free of white pigments. It would be desirable if a developed photographic dye set coated on a reflective support material had a dye hue angle that was not significantly different than the same dye set coated on a transparent support.

Nacreous pigments added to a matrix, such as paint or plastic, have been known to exhibit a nacreous appearance. The prior art use of the nacreous pigments have been for pigmenting paints, printing inks, plastics, cosmetics, and glazes for ceramics and glass. Nacreous pigments are dispersed in a matrix and then painted or printed onto a substrate. Pearl luster pigments containing titanium dioxide have been successfully employed for many years. They are constructed in accordance with the layer substrate principle, with mica being employed virtually without exception as substrate.

Mica pigments are used widely in the printing and coating industries, in cosmetology, and in polymer processing. They are distinguished by interference colors and a high luster. For the formation of extremely thin layers, however, mica pigments are not suitable, since the mica itself, as a substrate for the metal-oxide layers of the pigment, has a thickness of from 200 to 1200 nanometer. A further disadvantage is that the thickness of the mica platelets within a certain fraction defined by the platelet size in some cases varies markedly about a mean value. Moreover, mica is a naturally occurring mineral which is contaminated by foreign ions. Furthermore, technically highly complex and time-consuming processing steps are required including, in particular, grinding and classifying.

Pearl luster pigments based on thick mica platelets and coated with metal oxides have, owing to the thickness of the edge, a marked scatter fraction, especially in the case of relatively fine particle-size distributions below 20 micrometers. As a substitute for mica, it has been proposed to use thin glass flakes which are obtained by rolling a glass melt with subsequent grinding. Indeed, interference pigments based on such materials exhibit color effects superior to those of conventional, mica-based pigments. Disadvantages, however, are that the glass flakes have a very large mean thickness of about 10–15 micrometers and a very broad thickness distribution (typically between 4 and 20 micrometers), whereas the thickness of interference pigments is typically not more than 3 micrometers.

In U.S. Pat. No. 5,340,692 (Vermeulen et al) an imaging receiving material with nacreous pigment for producing contone images according to the silver salt diffusion process is disclosed. According to the process disclosed in U.S. Pat. No. 5,340,692, contone images with an antique look can be obtained utilizing the silver salt diffusion transfer process without the need of special processing liquids using a nacreous pigment in the imaging receiving layer or located between the support and the image receiving layer. The silver halide imaging layers used are created with retained silver and, therefore, are not semitransparent. Because the nacreous pigments used are contained in the imaging receiving layer and not silver halide imaging layer, the image form will not have a uniform nacreous appearance, as the density of the transferred silver halide image block the multiple reflections from the nacreous pigments. Further, the nacreous pigments utilized are too large and in too great a concentration to be included in the silver halide imaging layer as a rough surface would result, reducing the desired nacreous appearance of the image. The gold flakes used in the example in U.S. Pat. No. 5,340,692 are an attempt to simulate prior art black-and-white photographic "Sepatone" appearance produced during a post process treatment of the imaging layers. While the image in the example does have an antique appearance, the image does not have a nacreous appearance.

In U.S. Pat. No. 4,269,916 (Bilofsky et al) and related patents U.S. Pat. No. 4,288,524 and U.S. Pat. No. 4,216,018, instant photographic products having reflective layers which comprise lemellar interference pigments are disclosed. The intended use of the lemellar pigments is to create a pleasing white reflective appearance for the base material without the need for blue tints. It has been proposed that flat particles of metal oxides created by coating salts with metal oxides and later dissolving the salts leaving a thin flake of metal oxide as a substitute for spherical $TiO_2$ particles. Titanium dioxide particles typically are utilized in photographic art to create a white reflective surface for the viewing of print materials. The intent of U.S. Pat. No. 4,269,916 is to provide a white reflecting surface that does not have an angular viewing appearance and a consistent L*, thus the invention materials do not exhibit a nacreous appearance. Examples in U.S. Pat. No. 4,269,916 show high reflectivity at a variety of collection angles which is opposite of a nacreous appearance where reflectivity changes as a function of collection angle. Further, the lemellar pigments are not present in the silver halide imaging layers or in the base materials used in the invention.

In U.S. Pat. No. 5,858,078 (Andes et al), a process for the production platelet like, substrate free $TiO_2$ pigment is disclosed for use in printing inks, plastics, cosmetics and foodstuffs is.

In U.S. Pat. No. 5,733,658 (Schmid et al) luster pigments obtainable by treating titania coated silicate based platelets from 400° C. to 900° C. with a gas mixture comprising a vaporized organic compound and ammonia are described as useful for coloring paints, inks, plastics, glasses, ceramic products, and decorative cosmetic preparations.

When imaging supports are subject to variations in ambient conditions over long periods of time, the image-containing layers and resin layers tend to deteriorate into a mass of cracks which are aesthetically undesirable and which, in extreme cases, extend over the entire print completely destroying the image. All polymers are inherently prone to chemical degradation that leads to loss of mechanical properties. They undergo thermal degradation during processing such as extrusion of thin films, and photooxidative degradation with long-term exposure to light. The $TiO_2$ utilized in U.S. Pat. No. 5,858,078 and U.S. Pat. No. 5,733,658 catalyzes and accelerates both thermal and photooxidative degradation. In the art of resin coating imaging papers, the melt polymers are extruded at high temperatures and are also subjected to high shear forces. These conditions may degrade the polymer, resulting in discoloration and charring, formation of polymer slugs or "gels", and formation of lines and streaks in the extruded film from degraded material deposits on die surfaces. Also, thermally degraded polymer is less robust than non-degraded polymer for long-term stability, and may thereby shorten the life of the print.

It has been shown that when imaging layers such as silver halide, ink jet, flexography, and laser toner are applied to nacreous base materials, the nacreous appearance of the image is optimized when the image forming layers contain semitransparent dyes. The use of pigmented inks and dyes in the imaging layers tend to reduce the nacreous appearance of the image. In U.S. Pat. No. 6,071,654 (Camp et al) silver halide imaging layers that are semitransparent are coated on a nacreous support containing a voided polymer layer. The voided polymer layers create flat platelets oriented parallel to each other. The reflection, which reaches the eye, is primarily specular. It arises in depth, since each transparent polymer platelet reflects some of the incident light and reflects the remainder. The images in U.S. Pat. No. 6,071,654 exhibit a nacreous appearance.

PROBLEM TO BE SOLVED BY THE INVENTION

There is a need for a reflective imaging material that provides a nacreous or pearlescent appearance that provides a good photographic image.

SUMMARY OF THE INVENTION

It is an object of the invention to provide improved photographic materials.

It is another object to improved image appearance compared to prior art voided base photographic materials.

It is a further object to provide photographic materials that have a nacreous appearance independent of the base material.

These and other objects of the invention are accomplished by an imaging element comprising at least one layer of oriented polyolefin and nacreous pigment.

ADVANTAGEOUS EFFECT OF THE INVENTION

The invention provides brighter, snappy images that have a nacreous appearance while having exceptional photographic sharpness and exposure speed.

DETAILED DESCRIPTION OF THE INVENTION

Figure 1:
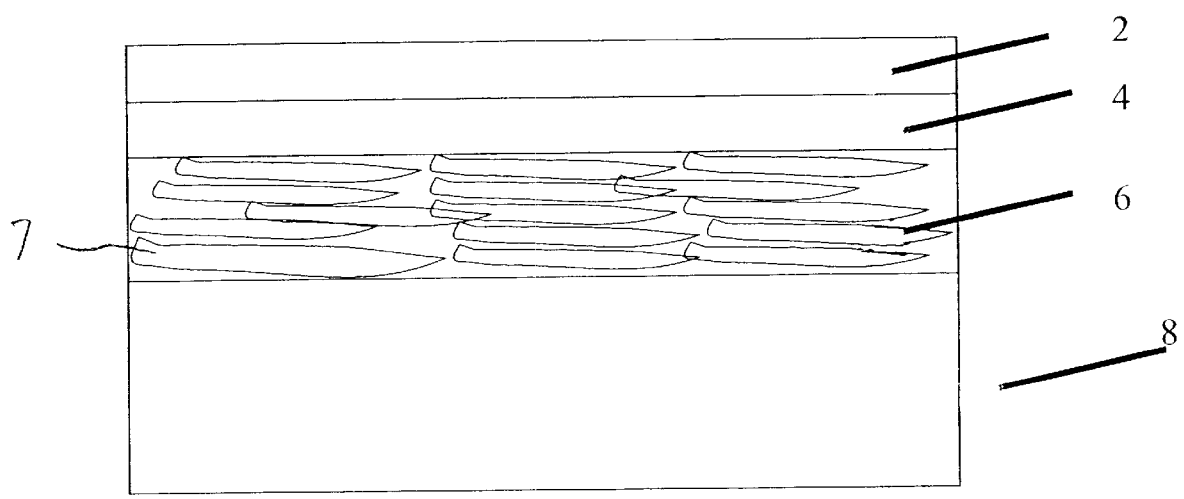
FIG. 1 is a cross-sectional view of an oriented nacreous sheet.

The invention has numerous advantages over prior art photographic reflective materials. The reflective materials of the invention provide an image with a nacreous appearance while maintaining efficient reflection of light, sharpness, and photographic speed. Maintaining image sharpness and whiteness is important, as consumers expect silver halide images to be high in quality. Further, maintaining printing speed is critical for efficient photographic processing, as a significant loss in printer speed could increase the cost of consumer silver halide images.

The nacreous imaging materials of the invention provide an eye-catching appearance that make them particularly desirable in imaging applications that require obtaining the attention of the consumer. One example includes display materials that are intended to communicate an advertising message to people in a public setting such as a bus stop, train station, or airport. The nacreous images are differentiated in look from prior art materials and, thus, provide the pop and sizzle that can catch the consumer's attention. By providing the nacreous image with a pressure sensitive adhesive, the tough, durable nacreous image can be applied to various surfaces, which is particularly desirable for the youth market.

Photographic nacreous labels of the invention utilized in packaging markets enable a differentiated look and consumer appeal on store shelf. The utilization of the thin, flexible, and tough silver halide materials results in a packaging material having many superior properties. The packaging materials of the invention have a depth of image unsurpassed by existing packaging materials. The packaging materials of the invention may be utilized with a variety of packaging materials that are suitable pressure sensitive labeling, such as shampoo bottles, perfume bottles, and film boxes. The packaging materials of the invention, while having the advantage of superior image, are available on thin base materials which are low in cost while providing superior opacity and strength. The packaging materials of the invention, as they may be imaged by flash optical exposure or digital printing, have the ability to be formed in short runs and to be rapidly switched from one image to the next without delay.

Conventional oriented sheets are cast extruded using a melt pump and or extruded screw and barrel to melt the incoming polymer. The extruder screw pushes the molten polymer into a feedblock or multi cavity die. The molten polymer is cast onto a wheel or moving belt. The polymer is quenched either by circulating a cooling liquid internal to the casting wheel and or immersing the polymer in a water bath. The polymer solidifies and then may be wound into roll form or it may be stretched only in one dimension such as the machine direction. This typically is achieved by using a series of temperature controlled rollers that are driven at increasing speed. This causes a uniaxially oriented of the cast polymer sheet. They uniaxially oriented sheet may then be wound in roll form or it may be further stretch in the cross machine direction using a tenter frame. Such a device holds the polymer sheet by its edge with a series of clips. The clips diverge causing the sheet to be stretched. Temperature is applied to the sheet to aid in the stretching process as well as to promote the formation of crystalline area within the sheet. Such a process enables the sheet to develop good mechanical properties. The sheet may be further heat relaxed to promote improved dimensional stability of the sheet.

The process described above is known as a sequential stretching process. The embodiments described herein are not limited to a sequential stretching process and may also be simultaneous stretched. In this process the cast sheet is stretched in both direction at the same time.

Figure 2:
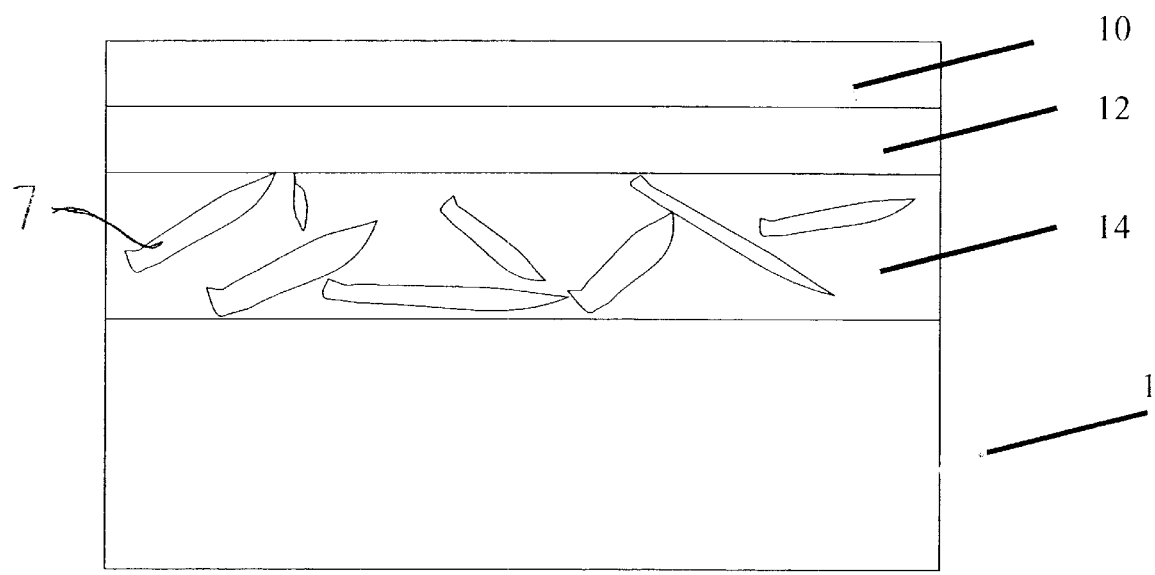
FIG. 2 is a cross-sectional view of a non-oriented nacreous sheet.

The orientation process is preferred over other processes such as resin coating in which the polymer is extruded onto a web such as paper or other plastic like sheet such as polyester. The orientation process is desirable because it allows the sheet to improve its mechanical properties such as modulus and toughness of the film. These are important properties to provide improve stiffness or good handling characteristics by the end user or to improve the web's transportability. Furthermore when nacreous particles are incorporated within at least one layer of the cast film, the orientation process provides better alignment of the particles. Since the nacreous particles are typically flat and needle like, the more aligned the particle are in their longest dimension to themselves and also to the perpendicular plane of the sheets thickness, the better the nacreous effect and also the better the mechanical properties. When flat metal oxide coated platelet particles are stacks on top of each other, the object is to provide reflection planes parallel to the image surface. This helps to provide improved optical performance. FIG. 1 provides a cross sectional view of an oriented non-voided sheet containing nacreous pigment and $TiO_2$ below the nacreous pigment. The top most layer 2 is a clear polymer layer. Layer 4 is a clear polymer layer furthering containing blue tint and optical brightener. Layer 6 is a polymer layer containing nacreous pigment 7 and layer 8 is a polymer layer containing $TiO_2$ to further enhance the overall whiteness of the sheet. In comparison FIG. 2 is a non oriented sheet containing nacreous particles. The top most layer 10 is a clear polymer layer. Layer 12 is a clear polymer layer furthering containing blue tint and optical brightener. Layer 14 is a polymer layer containing nacreous pigment 7 and layer 16 is a polymer layer containing $TiO_2$ to further enhance the overall whiteness of the sheet. As noted in this FIG. 2 the particles are less aligned in layer 14 than those particle shown in FIG. 1 layer 6. Without good alignment of the nacreous particles, the oriented sheet does not develop good nacreous optical properties because the less aligned particles are more light scattering and therefore interferes with the desired nacreous appearance. The orientation process also helps to minimize the overall surface roughness of the sheet. Having one or more integral layers on top of the layer comprising nacreous pigments as helps to minimize surface roughness. Minimizing the surface roughness helps to enhance the overall nacreous appearance.

The ability to provide cast sheets with a nacreous pigment provides the ability to incorporate an exciting new look to images. The nacreous pigment provides a unique peal-like effect of soft shimmering iridescence to the image. The ability to provide such a look is highly desired and valued in the field of imaging because it evokes a sense of feeling from the observer. Being able to attach an emotion to an image is essential to drawing people's attention to the image as well as implanting the image in a person mind. This is particularly useful in the field of advertising when you want the person to buy what is being sold. In conventional prints it is also useful because the image lingers in one's memory.

The term "nacreous" refers to a pearly, luster, and nacreous appearance. This may include a metallic, lustrous, and somewhat iridescent effect. The nacreous effect is the result of interference pigments that are platelet-like in their structure. Typically these are elongated platelet-like structures of silicate-based materials such as mica, feldspar, and quartz that have been metal oxide coated. These pigments tend to cause specular and diffuse reflection, and they also transmit some light. The use of nacreous pigments in the paint and printing industry are typically designed to create a variety of eye-popping colors. These materials are typically coated over dark black backgrounds to help accentuate the eye-popping optical effects. Special metal oxide coatings are applied to mica particles in very thin layers. This allows for some light to be refracted, while other light will transmit through to the near transparent layers of the mica particle to be refracted at a slightly different angle. Since these pigments are suspended in a binder polymer of yet another refractive index, there are multiple light refractions that create a lustrous appearance. In addition, the chemistry of the coating that is applied to the mica particles may be varied to create various colors. Metal oxide coatings that may be used in an embodiment of this invention include titanium, iron, chromium, barium, aluminum, zinc, zirconium, bismuth vanadate, nickel titanate, chromium titanate, lead, and others. While these produce some exciting colors in the field of photography and imaging, traditional print materials have a white background. Additionally, it should be noted that the thickness of the metal oxide coating on the mica may also impact the color. In a preferred embodiment of this invention the metal oxide coating on the mica particles may comprise titanium, aluminum, and/or barium. These materials are preferred because it is desirable to have a more traditional white background that can be achieved with these materials. The most preferred metal oxide is titanium because of its superior whiteness. Typically it is important to control the thickness of the metal oxide coating to less than 120 nanometers to achieve a blue white appearance.

With nacreous pigments used in imaging application, it may be desirable to have non-uniform platelet thickness and small particles to create a white nacreous appearance. In imaging application where a different look is desirable, the use of thicker particles and more uniform spacing of platelets to each other creates a color interference that is more characteristic of mother-of-pearl. In general, the lustrous pigments referred to in this invention are pigments that consist of flat mica platelets coated with titanium dioxide or other metal oxides. They are irregular in shape and may vary in thickness from 0.1 to 0.5 micrometers, although some individual particles may be thicker. The particles may have a length of up to 500 micrometers. The coating applied to the mica particles should be controlled in thickness, but the overall thickness is one parameter that controls the overall color appearance. Each transparent coating helps to create the lustrous or pearlescent effect. The particle of these pigments influences the perceived texture of the pearl luster effect and adds a new dimension of beauty and quality to the image. The coating may be colored with other compatible transparent pigments and dyestuffs. Metallic effects can be simulated by adding small amounts of carbon black with some silvery white pigments. The color seen is different than color pigments and dyes in that the color and lustrous iridescence is produced by light interference and not absorption or reflection of light. This is a suprisingly unique attribute to the field of silver halide photography and imaging. With the use of nacreous pigments there are many refractive interfaces that can produce a unique appearance to an imaging element. A light ray striking a layer containing nacreous platelets must pass through a substantially transparent layer of relatively lower refractive index binder polymer surrounding the platelet, and then the ray is then partially reflected by the metal oxide coating on the surface. The remaining part passes into the metal oxide coating layer and is again reflected as it exits the layer at the interface with the mica particle. Since the coating is very thin and the mica platelets are substantially transparent, the remaining light has many opportunities to be reflected at different angles. This helps to provide the luster nacreous appearance, as well as to add a three-dimensional quality to the image. The resulting color effect that is produced depends on the light reflection from the interfaces, as well as the type of coating on the mica particles. The multiple interfaces cause the reflected light to be slightly out of phase. It should also be noted that the color varies based on the angle of illumination and that an iridescence effect can be seen. Control of this effect is desirable depending on the effect that needs to be conveyed by the image. As noted above the thickness and type of the coating on the mica particles are factors that need to be considered. In addition the particle size can also be used to control the effect. For use in a photographic element it is desirable to have a smooth surface. To achieve this, a small particle is best but the layer thickness of the binder polymer in which the pigments are suspended may also be increased as well as applying clear overcoats. Larger particles are desirable when a bold effect with visual impact is desired. The nacreous effect can be changed by adjusting the particle size, metal oxide coating thickness and type, as well as the concentration of the pigment. In general, low pigmentation levels are better at producing a three-dimensional effect. This effect may be enhanced by applying a thick clear layer over the top of the nacreous pigments. When a more metallic sheen is desired, higher pigmentation levels are best. It should also be noted that different effects may be achieved by adding other transparent pigments and dyes in the layers. Since light sensitive photographic layers produce dye couplers that are semitransparent and typically do not contain pigment particles; they are uniquely positioned to be able to create synergistic effects with the nacreous pigments.

The nacreous pigments are relatively stable and generally resistant to alkali and acids, as well as high temperature. They can be dispersed in most carrying (binder polymer) media. Since the particles are substantially transparent, the use of a carrying media that is also transparent provides the maximum effect. If a more translucent carrying media is used, more nacreous pigment may be needed to achieve the same level of nacreous appearance.

In some applications it may be desirable to also have a nacreous pigment that is also conductive. This has some unique advantages in the area of photography that uses light sensitive layers. Static accumulation and discharge can result in a fogged layer. Being able to provide a conductive path that helps to prevent the charge from building up is an important element for imaging media. This not only helps prevent light fogging of light sensitive layer, but also allows sheets to slide over each other and various equipment parts without static buildup or cling of one sheet to another. This type of pigment is also a means of adding conductivity to the emulsion side of a photographic element. Conductive nacreous pigments consist of an inter core of platelet mica that is coated with materials such as $TiO_2$, $SiO_2$ and further coated with an outer layer of dense layer of conductive, inorganic mixed metal oxide. A typical material is antimony-doped tin dioxide. The elongated particles of mica are useful in providing a conductive pathway when particles are touching.

The origin of the beauty of a genuine pearl has been well documented. It is known that its luster and color come from the multiple smooth concentric layers of nacre, i.e., calcium carbonate layer, organic constituent (conchiolin) layer. Each of these layers partially reflects and transmits light. Hence, a sense of depth and luster is observed in the reflection. Pigments that try to simulate the visual effect of a pearl are called as pearlescent or nacreous pigments. The first nacreous pigment was the natural pearl. The commercial grades of nacreous pigments are made of thin transparent platelets of high refractive index. These pigments are so designed that multiple reflections and transmissions occur and, as a result, a sense of depth is obtained in the overall reflected image. The characteristics of the pigment determine whether color is produced by light interference (specifically called interference pigments) or no color is produced (called white nacreous pigments).

Some of the earliest pearlescent pigments were the plate-like bismuth oxychloride crystals, and basic lead carbonate. These pigments reflect light similar to a pearl essence crystal. Due to toxicity of lead, bismuth oxychloride (BiOCl) crystals have seen an increased use in the marketplace. BiOCl is generally crystallized from solution into smooth, thin platelets, which has a particle size ranging from 5 micrometer and 15 micrometer.

The other commonly used pearlescent pigments are those made from mica coated with either titanium dioxide (U.S. Pat. No. 4,040,859), iron oxide (U.S. Pat. No. 3,087,829), zirconium dioxide (U.S. Pat. No. 3,087,828), or other high refractive index materials. Mica is used because it is transparent to light and can be cleaved into extremely thin flakes. Examples of mica suitable for pearlescent pigments are muscovite, paragonite, phlogopite, biotite, and lepidolite. The mica platelets are then coated with a thin single layer or multiple layers of high refractive index inorganic oxide. The reflection efficiency depends to a large extent on the refractive index difference between the mica platelet and the inorganic oxide coating. This layered structure enables it to function like a pearlescent pigment. The oxide coating provides the optical effects like luster, interference reflection color (if oxide coating is sufficiently thick) and absorption color (if the oxide contains color material). The size of the mica particle also plays an important role in determining the final reflected image. The weight of the mica in the pigment usually lies between 40% and 90% and most usually in the range of 60% and 80%. If titanium dioxide is used as the coating and its coating thickness is increased, then an iridescence effect (color) is observed. The dimensions of pearlescent pigments used in this invention may be between 5 micrometer and 400 micrometer and preferably between 5 micrometer and 100 micrometer because particles less than 5 micrometer are not very efficient in creating the nacreous appearance, while particles greater than 100 micrometer progressively get rougher. Excessive roughness on the surface tends to shut down the nacreous appearance. The thickness of the pigment is preferably between 0.1 micrometer and 0.6 micrometer and more preferably between 0.2 micrometer and 0.4 micrometer. Particles less than 5 micrometer or less than 0.2 micrometer typically do not have sufficiently higher nacreous appearance, while particles greater than 400 micrometer in length or 0.6 micrometer in width typically are very large and tend to create roughness which starts to shut down the nacreous effect.

Other optically variable pigments that are suitably used are silicon oxide coated with thin layers of aluminum (5 nanometer and 10 nanometer) or titanium dioxide, and magnesium fluoride crystals coated with chromium have also been used. These pigment structures have been highlighted in U.S. Pat. No. 3,438,796. New optically variable pigment structures based on coated platelet like metallic substrates have been disclosed in U.S. Pat. No. 5,364,467 and U.S. Pat. No. 5,662,738. U.S. Pat. No. 5,976,511 discloses pigments composed of barium sulfate particles and coated with zinc oxide, cerium oxide, or titanium dioxide which have a pearly luster.

The photographic elements of this invention may utilize an integral emulsion bonding layer that allows the emulsion to adhere to the support materials during manufacturing and wet processing of images without the need for expensive subbing coatings.

The terms as used herein, "top", "upper", "emulsion side", and "face" mean the side or toward the side of a photographic member bearing the imaging layers. The terms "bottom", "lower side", and "back" mean the side or toward the side of the photographic member opposite from the side bearing the photosensitive imaging layers or developed image. Nacreous appearance is a pearly, luster, iridescent, metallic sheen. A characteristic property of a nacreous appearance is an angular dependence of viewing angle.

The term substantially free of voids means that greater than 85% of the volume of the layer has is solid polymer or pigment. When using large modified mica particles and then stretching the film, it is often difficult to prevent some void formation as the polymer matrix is stretched across the surface of the large particles.

One or several light sensitive coatings based on silver halides may be applied to one of the polymer resin layers. The light sensitive layers can be black and white, as well as color photographic layers. Non-photographic image forming materials are used such as inkjet, thermal dye transfer, electrophotographic liquid or plastic toner or other methods known in the art may be used. Dye based materials are preferred because they do not mask the nacreous effect.

The polymer cast coated layers (front side coating) positioned under the light sensitive layer or imaging layer in conventional photographic paper usually contains light reflecting white pigment, as well as coloring pigments, optical brighteners and, if necessary, other additives such as antistatic agents, dispersing agents for the pigment, etc. Typical white pigments include $TiO_2$, $BaSO_4$, $CaCO_3$, talcs, clays, ZnO, ZnS and other pigments known in the art. The cast coated layers may also be one or more layers. In conventional images, the pigment is directly below the image layer to provide a highly reflective white layer. When combining white pigments with nacreous pigment it is desirable to have the white pigments under the nacreous pigments. White pigments above the nacreous pigment will shut down the effect.

The polymer resin film (back side coating) positioned on the paper side which is opposite the light-sensitive layers, can be pigmented or unpigmented and/or contain other additives and may be one or more layers. This layer can be coated with one or more further functional layers, e.g. layers for recordability, anti-static layer, sliding layer, adhesive layer, anti-curl layer or anti-halation layer.

The coating of a photographic base paper with polyolefin by extrusion through a T-die is a process that is already known. The polyolefin extrusion coating takes place at a point where the paper web enters the nip between the chill roll and a rubber roll through which the polyolefin film is adhered to the paper web. The chill roll also serves for the formation of the surface structure of the polyolefin layer. Correspondingly to the composition of the chill roll surface, e.g. glossy, dull or structured (for example, silk-like), polyolefin surfaces can be produced.

Waterproof photographic papers consist of a paper support with polymer resin layers applied onto both faces and of a photosensitive coating consisting of one or more layers based upon silver salts on one of the synthetic resin surfaces. The photosensitive layers may involve either black and white or color photographic layers.

For prior art resin coated imaging support, a most important constituent in the front face coating situated between the base paper and photosensitive or other imaging coatings is, apart from the water-repellent polymer resin binder, the light-reflecting white pigment. This white pigment is determining not only for the visual impression of a photographic image, but also for the imaging quality and the durability of the photographic image produced in the adjoining photographic layers. A number of publications and inventions, therefore, concern themselves with the pigmenting of this water-repellent front face coating of the paper support. In particular the pigmenting of a front face coating based upon polyolefin and applied by extrusion coating, is the subject of a number of investigations. While this method provides an acceptable and pleasing image, it is limited in the overall mechanical strength that it can provide. Therefore cast coated and oriented polymer supports are more desirable.

The pigment containing polyolefin-coating material can be applied onto one or both sides of the paper. It consists essentially of a polyolefin (80–95% by weight), a titanium dioxide (20–5% by weight) and of an addition according to the present invention of 0.05–20% by weight of an alkaline earth carbonate or oxide. In conventional photographic resin coated paper, titanium dioxide is used because of its high refractive index, which gives excellent optical properties at a reasonable cost. The pigment is used in any form that is conveniently dispersed within the polyolefin. Anatase titanium dioxide is used when the overall lightness and brightness is desired in the product. Rutile titanium dioxide is used because it has the highest refractive index at the lowest cost. The high refractive index is used when image sharpness is desired. The average pigment diameter of the rutile $TiO_2$ is in the range of 0.1 to 0.26 micrometer. The pigments that are greater than 0.26 micrometer are too yellow for an imaging element application and the pigments that are less than 0.1 micrometer are not sufficiently opaque when dispersed in polymers. The white pigment should be employed in the range of from about 10 to about 50 percent by weight, based on the total weight of the polyolefin coating. Below 10 percent $TiO_2$, the imaging system will not be sufficiently opaque and will have inferior optical properties. Above 50 percent $TiO_2$, the polymer blend is less manufacturable. The surface of the $TiO_2$ can be treated with an inorganic compound such as aluminum hydroxide, alumina with a fluoride compound or fluoride ions, silica with a fluoride compound or fluoride ion, silicon hydroxide, silicon dioxide, boron oxide, boria-modified silica (as described in U.S. Pat. No. 4,781,761), phosphates, zinc oxide, $ZrO_2$, etc. and with organic treatments such as polyhydric alcohol, polyhydric amine, metal soap, alkyl titanate, polysiloxanes, silanes, etc. The organic and inorganic $TiO_2$ treatments can be used alone or in any combination. The amount of the surface treating agents is preferably in the range of 0.2 to 2.0% for the inorganic treatment and 0.1 to 1% for the organic treatment, relative to the weight of the weight of the titanium dioxide. At these levels of treatment the $TiO_2$ disperses well in the polymer and does not interfere with the manufacture of the imaging support. When high loading of pigment a are desired, it may be beneficial to use a coextrusion process in which one or more layer are extruded with a multi-slot die or feed block arrangement. The value of multi layers is that it allows layers with high pigment high loading that may be weak and unstable to the extrusion processing and coating conditions to be coated with other layers with little or no loading that provide the required strength.

Useful antioxidant in polyolefins when TiO2 is incorporated in the polymer include hindered amine is selected from the group consisting of poly{[6-[(1,1,3,3-tetramethylbutylamino}-1,3,5-triazine-4-piperidinyl)-imino]-1,6-hexanediyl[(2,2,6,6-tetramethyl-4-piperdinyl) imino]} pentaerythrityl tetrakis [3-(3,5-di-tert-butyl-4-hydroxyphenyl)proprionate], and 2,4-bis(1,1-dimethylphenyl) phosphite (Irgafos 168).

The hindered amine light stabilizer (HALS) may come from the common group of hindered amine compounds originating from 2,2,6,6-tetramethylpiperidine, and the term hindered amine light stabilizer is accepted to be used for hindered piperidine analogues. The compounds form stable nitroxyl radicals that interfere with photo-oxidation of polypropylene in the presence of oxygen, thereby affording excellent long-term photostability of the imaging element. The hindered amine will have sufficient molar mass to minimize migration in the final product, will be miscible with polypropylene at the preferred concentrations, and will not impart color to the final product. In the preferred embodiment, examples of HALS include poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-pi peridinyl)imino]] (such as Chimassorb 944 LD/FL), 1,3,5-triazine-2,4,6-triamine, N,N"-1,2-ethanediylbis[N-[3-[[4,6-bis[butyl(1,2,2,6,6-pentamethyl-4-piperi dinyl)amino]-1,3,5-triazin-2-yl]methylamino] propyl]-N',N"-dibutyl-N', N"-bis (1,2,2,6,6-pentamethyl-4-piperidinyl)-(such as Chimassorb 119), and propanedioic acid, [[3,5-bis(1,1-dimethylethyl)-4-hydroxyphenyl]methyl] butyl-, bis(1,2,2,6,6-pentamethyl-4-piperidinyl) ester (such as Tinuvin 144), although they are not limited to these compounds. In addition, the film may contain any of the hindered phenol primary antioxidants commonly used for thermal stabilization of polypropylene, alone or in combination with a secondary antioxidants. Examples of hindered phenol primary antioxidants include benzenepropanoic acid, 3,5-bis(1,1-dimethylethyl)-4-hydroxy-,2,2-bis[[3-[3,5-bis (1,1-dimethylethy l)-4-hydroxyphenyl]-1-oxopropoxy] methyl]-1,3-propanediyl ester (such as Irganox 1010), benzenepropanoic acid, 3,5-bis(1,1-dimethylethyl)-4-hydroxy-, octadecyl ester (such as Irganox 1076), (such as Irganox 1035), phenol, 4,4',4"-[(2,4,6-trimethyl- 1,3,5-benzenetriyl) tris(methylene)]tris[2,6-bis(1,1-dimethylethyl)-(such as Irganox 1330), but are not limited to these examples. Secondary antioxidants include organic alkyl and aryl phosphites including examples such as Phosphorous acid, bis[2,4-bis(1,1-dimethylethyl)-6-methylphenyl] ethyl ester (such as Irgafos 38), ethanamine, 2-[[2,4,8,10-tetrakis(1,1-dimethylethyl)dibenzo[d,f][1,3,2]dioxaphosphepin -6-yl]oxy]-N,N-bis[2-[[2,4,8,10-tetrakis(1,1-dimethylethyl)dibenzo[d,f][1,3 ,2]dioxaphosphepin-6-yl]oxy]ethyl] (such as Irgafos 12), phenol, 2,4-bis(1,1-dimethylethyl)-, phosphite (such as Irgafos 168). A preferred embodiment uses Irgafos 168. The combination of hindered amines with other primary and secondary antioxidants have a synergistic benefit in a multilayer biaxially oriented polymer sheet by providing thermal stability to polymers such as polypropylene during melt processing and extrusion and further enhancing their light and dark keeping properties which is not evident in a mono layer system for imaging products such as photographs. Whenever oxygen bearing or producing pigment such as $TiO_2$ are used in plastic and in particular when they are used in voided plastic layers, it may be necessary to provide antioxidant protection to minimize polymer degradation. These unexpected results provide for a broader range of polymers that can be utilized in imaging product, thus enabling enhanced features to be incorporated into their design. Additional disclosure of antioxidant can be found in U.S. Pat. No. 6,171,751.

As noted above prior art traditional imaging structure are all above providing a highly white reflective layer either directly under the image layer or separated by a very thin clear layer. As noted with the embodiments of this invention the use of nacreous pigments require that any white reflecting pigment layer be below the nacreous layers. The use of white pigments between the image layer and the nacreous containing layers will substantially reduce or eliminate the nacreous appearance. Any layer between the image layer and the nacreous layer should be substantially free of white pigment. That is the layer should not contain more than 1% by weight of a white pigment.

For the purpose of this invention the term polymer unless otherwise defined refers to a melt extrudable resin such as polyolefins, polyesters, polyamides and or polycarbonate and their copolymers and combinations thereof In a preferred embodiment of this invention an imaging element comprises at least one layer of oriented polyolefin and a nacreous pigment. This embodiment is preferred because it provides an image that is has a unique appearance of pearl-like iridescence. Polyolefins and in particular polyethylenes are desirable to enhance adhesion between the image layer and the top layer of the base support. Polyolefins are also desired because they are low in cost and when they have been cast, they may be oriented to a higher level than such materials as polyesters. Polypropylenes are desirable for stretching because they can be stretched up to 40 times while polyester can typically be stretched only 9 times. That is 3 times in the machine direction and 3 times in the cross direction. In an additional preferred embodiment of this invention, the oriented sheet is substantially free of voids. While the inclusion of voids in an oriented sheet provide some useful function such as opacity, the voids tend to mechanically weaken the sheet. High levels of modulus provide strong and stiff imaging elements that have good handling characteristics and also resist bending and cracking.

In one embodiment of this invention the imaging element with oriented polyolefin and nacreous pigment is laminated on the upper surface of a substrate. Suitable substrates may include paper, cardboard, cloth, polyester, polycarbonate, polyamide, or other plastic webs.

In imaging products, when white pigments such as $TiO_2$ are used in polyolefin polymers, there is a need to protect and stabilize the polymer from degradation of light induced cracking and molecular weight loss. Some nacreous pigments are coated with or treated with titanium based compounds. If these materials contains oxygen species, there may be problems with light induced degradation. In a preferred embodiment of this invention, one layer that comprises polyolefin and nacreous pigment also contains hindered amine light stabilizer.

When nacreous pigments are used in oriented films, it may be necessary to provide a layer of clear polymer to control the overall roughness of the oriented film. Nacreous pigments typically have a large particle size that may be greater than 3 micrometers. As the overall surface roughness increases, the surface roughness may create sufficient diffuse light scattering as to minimize or eliminate the nacreous appearance. In a preferred embodiment of this invention, there is at least one layer of polyolefin that is substantially free of nacreous pigment. A clear layer above the nacreous pigment layer helps to provide a smoothing effect that minimizes light scattering. The maximum effect of nacreous appearance is best achieved when the surface above the nacreous pigment is less than 1.2 micrometers. Having an optical clear layer on top also helps to provide the maximum nacreous effect. The term optically clear layer refers to a layer that is able to transmit without distortion substantially 100% of the light entering the layer.

In general many of the nacreous mica metal oxide modified pigments impart a color. The titanium dioxide base surface coating are the best for overall whiteness but tend to be slightly yellow. By having a white pigment layer below the layer containing nacreous pigment added whiteness may be obtained in the final print. When the imaging material is light sensitive silver halide, a layer with white pigment below the nacreous pigment provides improved sharpness as well as photographic speed and apparent sharpness. Suitable white pigments that can be used include talc, clay $CaCO_3$, $BaSO_4$, $TiO_2$, ZnS. The preferred white pigment is $TiO_2$ because of it high level of reflectivity and high refractive index.

In one preferred embodiment of this invention the nacreous pigment is present in the imaging element in an amount between 100 and 1500 $mg/m^2$ to give bright opalescent appearance. Amounts greater than 1500 $mg/M^2$ tend to scatter light and are less effective in creating the nacreous effect. Nacreous pigment in an amount below 100 $mg/m^2$ do not have sufficient concentration to provide the desired visual appeal.

In a further embodiment of this invention the nacreous pigment has a preferred mean particle size of between 2 and 5 micrometers. Generally particles with a mean particle size greater than 5 micrometers tend to create a rough surface and the added light scattering reduces the nacreous appearance while particles with a mean size of less than 2 generally do not exhibit the nacreous effect.

In the preferred embodiment of this invention the image layers of the imaging element are photographic. Photographic imaging elements are preferred because they are dye based which helps to maximize the nacreous appearance. The use of pigments to form an image tends to obscure the effect. Photographic images provide excellent replication of the image and can produce a wide range of colors.

In one embodiment of this invention the nacreous pigment is present in an amount between 0.5% and 5% of the layer in which it is present. Below 0. 5% there is not a sufficient amount to create the nacreous appearance while amounts greater than 5% typically do not provide any additional benefit for the added expense of the nacreous pigment.

In a preferred embodiment of this invention the layer of oriented polyolefin and nacreous pigment further comprises between 4 and 50 reflection planes. Less than 4 reflection planes does not exhibit the nacreous effect while more than 50 reflection planes does not substantially improve the nacreous appearance.

In the most preferred embodiment said at least one layer of oriented polyolefin and nacreous pigment further comprises between 10 and 25 reflection planes. This range is preferred because above 25 the surface of the nacreous containing layer starts to progressively get rougher. With at least 10 reflection planes, the nacreous appearance provides a more satisfying image. The following examples illustrate the practice of this invention. They are not intended to be exhaustive of all possible variations of the invention. Parts and percentages are by weight unless otherwise indicated.

The preferred photographic elements of the present invention can be simple black-and-white or monochrome elements comprising a support bearing a layer of light-sensitive silver halide emulsion, or they can be multilayer and/or multicolor elements.

Color photographic elements of this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art.

The light-sensitive silver halide emulsions employed in the photographic elements of this invention can include coarse, regular, or fine grain silver halide crystals or mixtures thereof and can be comprised of such silver halides as silver chloride, silver bromide, silver bromoiodide, silver chlorobromide, silver chloroiodide, silver chorobromoiodide, and mixtures thereof. The emulsions can be, for example, tabular grain light-sensitive silver halide emulsions. The emulsions can be negative-working or direct positive emulsions. They can form latent images predominantly on the surface of the silver halide grains or in the interior of the silver halide grains. They can be chemically and spectrally sensitized in accordance with usual practices. The emulsions typically will be gelatin-emulsions, although other hydrophilic colloids can be used in accordance with usual practice. Details regarding the silver halide emulsions are contained in and described in *Research Disclosure*, September 1994, Item 36544, Section I, published by Kenneth Mason Publications, Ltd., Dudley Annex, 12a North Street, Emsworth, Hampshire PO10 7DQ, ENGLAND as well as *Research Disclosure*, Item 36544, September 1994, and the references listed therein, as well as *Research Disclosure*, September 2000, Item 437013, published by Kenneth Mason Publications, Ltd., Dudley Annex, 12a North Street, Emsworth, Hampshire PO10 7DQ, ENGLAND.

The photographic silver halide emulsions utilized in this invention can contain other addenda conventional in the photographic art. Useful addenda are described, for example, in *Research Disclosure*, Item 36544, September 1994, and *Research Disclosure*, September 2000, Item 437013, published by Kenneth Mason Publications, Ltd., Dudley Annex, 12a North Street, Emsworth, Hampshire PO10 7DQ, ENGLAND. Useful addenda include spectral sensitizing dyes, desensitizers, antifoggants, masking couplers, DIR couplers, DIR compounds, antistain agents, image dye stabilizers, absorbing materials such as filter dyes and UV absorbers, light-scattering materials, coating aids, plasticizers and lubricants, and the like.

In another embodiment of the invention the imaging elements of the invention may be coated with an inkjet or dye receiving layer. The dye receiving layer or DRL for ink jet imaging may be applied by any known methods. Such as solvent coating, or melt extrusion coating techniques. The DRL is coated over the tie layer (TL) at a thickness ranging from 0.1–10 μm, preferably 0.5–5 μm. There are many known formulations which may be useful as dye receiving layers. The primary requirement is that the DRL is compatible with the inks which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al., in U.S. Pat. Nos. 4,879,166, 5,14,730, 5,264,275, 5,104,730, 4,879,166, and Japanese patents 1,095,091, 2,276,671, 2,276,670, 4,267,180, 5,024, 335, 5,016,517, discloses aqueous based DRL formulations comprising mixtures of psuedo-bohemite and certain water soluble resins. Light, in U.S. Pat. Nos. 4,903,040, 4,930,041, 5,084,338, 5,126,194, 5,126,195, 5,139,8667, and 5,147, 717, discloses aqueous-based DRL formulations comprising mixtures of vinyl pyrrolidone polymers and certain water-dispersible and/or water-soluble polyesters, along with other polymers and addenda. Butters, et al., in U.S. Pat. Nos. 4,857,386, and 5,102,717, disclose ink-absorbent resin layers comprising mixtures of vinyl pyrrolidone polymers and acrylic or methacrylic polymers. Sato, et al., in U.S. Pat. No. 5,194,317, and Higuma, et al., in U.S. Pat. No. 5,059,983, disclose aqueous-coatable DRL formulations based on poly (vinyl alcohol). Iqbal, in U.S. Pat. No. 5,208,092, discloses water-based IRL formulations comprising vinyl copolymers which are subsequently cross-linked. In addition to these examples, there may be other known or contemplated DRL formulations which are consistent with the aforementioned primary and secondary requirements of the DRL, all of which fall under the spirit and scope of the current invention.

The preferred DRL is a 0.1–10 μm DRL which is coated as an aqueous dispersion of 5 parts alumoxane and 5 parts poly (vinyl pyrrolidone). The DRL may also contain varying levels and sizes of matting agents for the purpose of controlling gloss, friction, and/or finger print resistance, surfactants to enhance surface uniformity and to adjust the surface tension of the dried coating, mordanting agents, antioxidants, UV absorbing compounds, light stabilizers, and the like.

Although the ink-receiving elements as described above can be successfully used to achieve the objectives of the present invention, it may be desirable to overcoat the DRL for the purpose of enhancing the durability of the imaged element. Such overcoats may be applied to the DRL either before or after the element is imaged. For example, the DRL can be overcoated with an ink-permeable layer through which inks freely pass. Layers of this type are described in U.S. Pat. Nos. 4,686,118, 5,027,131, and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, i.e., continuous, piezoelectric, or thermal. Therefore, depending on the specific ink process, the inks may contain widely differing amounts and combinations of solvents, colorants, preservatives, surfactants, humectants, and the like. Inks preferred for use in combination with the image recording elements of the present invention are water-based, such as those currently sold for use in the Hewlett-Packard Desk Writer 560C, 840C and other printers. However, it is intended that alternative embodiments of the image-recording elements as described above, which may be formulated for use with inks which are specific to a given ink-recording process or to a given commercial vendor, fall within the scope of the present invention.

Alternatively the imaging elements useful in this invention may have a thermal dye receiving layer. The thermal dye image-receiving layer of the receiving elements of the invention may comprise, for example, a polycarbonate, a polyurethane, a polyester, polyvinyl chloride, poly(styrene-co-acrylonitrile), poly(caprolactone) or mixtures thereof. The dye image-receiving layer may be present in any amount which is effective for the intended purpose. In general, good results have been obtained at a concentration of from about 1 to about 10 g/m$^2$. An overcoat layer may be further coated over the dye-receiving layer, such as described in U.S. Pat. No. 4,775,657 of Harrison et al.

Dye-donor elements that are used with the dye-receiving element of the invention conventionally comprise a support having thereon a dye containing layer. Any dye can be used in the dye-donor employed in the invention provided it is transferable to the dye-receiving layer by the action of heat. Especially good results have been obtained with sublimable dyes. Dye donors applicable for use in the present invention are described, e.g., in U.S. Pat. Nos. 4,916,112, 4,927,803 and 5,023,228.

As noted above, dye-donor elements are used to form a dye transfer image. Such a process comprises image-wise-heating a dye-donor element and transferring a dye image to a dye-receiving element as described above to form the dye transfer image.

In a preferred embodiment of the thermal dye transfer method of printing, a dye donor element is employed which compromises a poly-(ethylene terephthalate) support coated with sequential repeating areas of cyan, magenta, and yellow dye, and the dye transfer steps are sequentially performed for each color to obtain a three-color dye transfer image. Of course, when the process is only performed for a single color, then a monochrome dye transfer image is obtained.

Thermal printing heads which can be used to transfer dye from dye-donor elements to receiving elements of the invention are available commercially. There can be employed, for example, a Fujitsu Thermal Head (FTP-040 MCS001), a TDK Thermal Head F415 HH7-1089 or a Rohm Thermal Head KE 2008-F3. Alternatively, other known sources of energy for thermal dye transfer may be used, such as lasers as described in, for example, GB No. 2,083,726A.

A thermal dye transfer assemblage of the invention comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The electrographic and electrophotographic processes and their individual steps have been well described in detail in many books and publications. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps; the use of liquid toners in place of dry toners is simply one of those variations.

The first basic step, creation of an electrostatic image, can be accomplished by a variety of methods. The electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In one form of the electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In one form of the electrophotographic process, a photosensitive element is permanently imaged to form areas of differential conductivity. Uniform electrostatic charging, followed by differential discharge of the imaged element, creates an electrostatic image. These elements are called electrographic or xeroprinting masters because they can be repeatedly charged and developed after a single imaging exposure.

In an alternate electrographic process, electrostatic images are created iono-graphically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed, to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to paper (or other substrate). The paper is charged electrostatically, with the polarity chosen to cause the toner particles to transfer to the paper. Finally, the toned image is fixed to the paper. For self-fixing toners, residual liquid is removed from the paper by air-drying or heating. Upon evaporation of the solvent these toners form a film bonded to the paper. For heat-fusible toners, thermoplastic polymers are used as part of the particle. Heating both removes residual liquid and fixes the toner to paper.

EXAMPLES

The proposed examples used would be build as follows:

Example 1 (Control)

The control sample was standard resin coated photographic paper. It represents a typical photographic paper base of approximately 160 g/m² of photo quality paper with 26 g/m² pigmented of low density polyethylene (0.917 g/cc) on the top side. This layer contains approximately 12% by weight of anatase $TiO_2$, an optical brightener and blue tints. On the backside was a layer of 28 g/m² of clear high density (0.924 g/cc) polyethylene. In the control and sample 7 there are no nacreous pigments in any layer. The paper base used is described below. Photographic grade cellulose paper base used in the invention: The paper base was produced for the invention using a standard fourdrinier paper machine and a blend of mostly bleached hardwood Kraft fibers. The fiber ratio consisted primarily of bleached poplar (38%) and maple/beech (37%) with lesser amounts of birch (18%) and softwood (7%). Fiber length was reduced from 0.73 mm length weighted average as measured by a Kajaani FS-200 to 0.55 mm length using high levels of conical refining and low levels of disc refining. Fiber Lengths from the slurry were measured using a FS-200 Fiber Length Analyzer (Kajaani Automation Inc.). Energy applied to the fibers is indicated by the total Specific Net Refining Power (SNRP) was 127 KW hr/metric ton. Two conical refiners were used in series to provide the total conical refiners SNRP value. This value was obtained by adding the SNRPs of each conical refiner. Two disc refiners were similarly used in series to provide a total Disk SNRP. Neutral sizing chemical addenda, utilized on a dry weight basis, included alkyl ketene dimer at 0.20% addition, cationic starch (1.0%), polyaminoamide epichlorhydrin (0.50%), polyacrylamide resin (0.18%), diaminostilbene optical brightener (0.20%), and sodium bicarbonate. Surface sizing using hydroxyethylated starch and sodium chloride was also employed but is not critical to the invention. In the 3$^{rd}$ Dryer section, ratio drying was utilized to provide a moisture bias from the face side to the wire side of the sheet. The face side (emulsion side) of the sheet was then remoisturized with conditioned steam immediately prior calendering. Sheet temperatures were raised to between 76° C. and 93° C. just prior to and during calendering. The paper was then calendered to an apparent density of 1.17. Moisture levels after the calender were 7.0% to 9.0% by weight.

Example 2

In this proposed example both a top and bottom cast oriented sheet are formed and then laminated to a paper base. Other examples that would exhibit the nacreous appearance would include lamination to a polyester or plastic supporting base.

Bottom Cast Oriented Sheet

The bottom biaxially oriented sheet laminated to the backside of invention base was a one-side matte finish, one-side treated biaxially oriented polypropylene sheet (25.6 μm thick) (d=0.90 g/cc) consisting of a solid oriented polypropylene layer and a skin layer of a mixture of polyethylenes and a terpolymer comprising ethylene, propylene, and butylene. The skin layer was on the bottom and the polyproylene layer and laminated to the paper. The cast oriented sheet was melt extrusion laminated to the above cellulose paper base using a metallocene catalyzed ethylene plastomer (SLP 9088) manufactured by Exxon Chemical Corp. The metallocene catalyzed ethylene plastomer had a density of 0.900 g/cc and a melt index of 14.0. The layer down of the 10 g/m².

Top cast uniaxially oriented nacreous non-voided sheet: The top sheet used in this example would have 5 layers of uniaxially oriented polyolefin polymer.

L1: Clear low density polyethylene plus blue tint
L2: Clear low density polypropylene with optical brightener
L3: Nacreous filled low density polypropylene
L4: Polypropylene with TiO2
L5: Clear polypropylene The above top sheet has the L1 layer as a thin skin of low density polyethylene (0.910 g/cc). The layer is 0.08 micrometers thick and has Sheppard blue tint to provide an overall blue white to the final assembled base. L2 is a low density (0.910 g/cc) polypropylene that is approximately 18 micrometers. It also has 0.5% of Hostalux KS by weight of the layer. The L3 layer is a low density polypropylene that contains 1000 mg/ m² of Afflair 110 has supplied by EM Industry, Inc. The layer is 35 micrometers thick. Below this layer is the L4 layer which is a layer that is 18 micrometers thick and contains 32% by weight of Dupont 104 rutile $TiO_2$ in low density polypropylene. L5 is a thin layer on the topside of the above structure. It is a clear polypropylene that is 0.08 micrometer thick. The above structure would be melt extruded from coat hanger die that is feed by a multi port feedblock at 250° C. The molten extrudate was cast onto a casting wheel, cooled and then striped off and then roll drafted in a series of heated rollers. The film was stretched 4 times in the machine direction and wound into a roll form. The nacreous cast oriented sheet is then laminated to the top side of the photographic base sheet described above using a metallocene catalyzed ethylene plastomer (SLP 9088) manufactured by Exxon Chemical Corp. The metallocene catalyzed ethylene plastomer had a density of 0.900 g/cc and a melt index of 14.0. The lay down of the plastomer was 10 g/m².

Example 3

Example 3 was the similar to example 2 except the nacreous effect was in a stand alone web as opposed to being made as a thin sheet that was then laminated to a base substrate.

Cast uniaxially oriented nacreous non-voided web substrate:

The web substrate used in this example would have 5 layers of uniaxially oriented polyolefin polymer.

L1: Clear low density polyethylene plus blue tint
L2: Clear low density polypropylene with optical brightener
L3: Nacreous filled low density polypropylene
L4: Polypropylene with $TiO_2$
L5: Talc/Mica filled polypropylene The above web substrate has the L1 layer as a thin skin of low density polyethylene (0.910 g/cc). The layer is 0.08 micrometers thick and has Sheppard blue tint to provide an overall blue white to the final assembled base. L2 is a low density (0.910 g/cc) polypropylene that is approximately 25 micrometers. It also has 0.5% of Hostalux KS by weight of the layer. The L3 layer is a low density polypropylene that contains 3% by weight of Afflair 110 has supplied by EM Industry, Inc. The layer is 75 micrometers thick. Below this layer is the L4 layer which is a layer that is 25 micrometers thick and contain 32% by weight of Dupont 104 rutile $TiO_2$ in low density polypropylene. L5 is a thick (125 micrometer) stiffening layer that was filled with flat platelet like mica at 27% by weight. The above structure would be melt cast extruded from coat hang die that is feed by a multi port feedblock at 275 C. The molten extrudate was cast onto a casting wheel, quenched in a water bath and then roll drafted in a series of heated rollers. The film was stretch 4 times in the machine direction and wound into a roll form.

The above describe bases were coated with a standard photographic silver halide emulsion which includes a size overcoat, three light sensitive silver halide emulsion units with a color dye forming, and interlayers to separate the various light sensitive layers. After imaging, the photographic element was developed using standard RA4 chemistry. A detailed description of this photographic emulsion are contained in and described in *Research Disclosure*, September 1994, Item 36544, Section I, published by Kenneth Mason Publications, Ltd., Dudley Annex, 12a North Street, Emsworth, Hampshire PO10 7DQ, ENGLAND as well as *Research Disclosure*, Item 36544, September 1994, and the references listed therein, as well as *Research Disclosure*, September 2000, Item 437013, published by Kenneth Mason Publications, Ltd., Dudley Annex, 12a North Street, Emsworth, Hampshire PO10 7DQ, ENGLAND. Useful addenda include spectral sensitizing dyes, desensitizers, antifoggants, masking couplers, DIR couplers, DIR compounds, antistain agents, image dye stabilizers, absorbing materials such as filter dyes and UW absorbers, light-scattering materials, coating aids, plasticizers and lubricants, and the like.

The above samples were visually assessed to determine the presence of the nacreous appearance. This was achieved by viewing the assembled and imaged prints in reflected light. The nacreous appearance is detected when the samples are viewed at various angles. The colors or background d-min appear to change in appearance. The spectral and diffusive properties changed based on viewing angle while samples not containing the nacreous pigment do not change in the viewer's perception.

TABLE 1

| Example | Nacreous Appearance |
|---------|---------------------|
| 1 (Control) | No |
| 2 | Yes |
| 3 | Yes |

As can be seen from Table 1, the control sample 1 does not exhibit the nacreous appearance while sample 2 and 3 that contain the nacreous pigment both exhibit the effect.

The invention has been described in detail with particular reference to certain preferred embodiments thereof, but it will be understood that variations and modifications can be effected within the spirit and scope of the invention.

What is claimed is:

1. An imaging element comprising at least one layer of oriented polyolefin and nacreous pigment.

2. An imaging element of claim 1 wherein said at least one layer of oriented polyolefin is substantially void free.

3. An imaging element of claim 1 wherein said at least one layer of oriented polyolefin is lamninated on the upper surface of a substrate.

4. An imaging element of claim 3 wherein said substrate comprises at least one material from the group consisting of paper, cardboard, cloth, polyester, polycarbonate, and polyamide.

5. An imaging element of claim 1 wherein said at least one layer comprising polyolefin and nacreous pigment further comprises hindered amine light stabilizers.

6. An imaging element of claim 1 wherein further comprising at least one layer of polyolefin substantially free of nacreous pigment.

7. An imaging element of claim 1 further comprising at least one layer, below said layer comprising nacreous pigment, that comprises white pigment.

8. An imaging element of claim 7 wherein said white pigment is $TiO_2$.

9. The imaging element of claim 6 wherein said at least one layer of polyolefin substantially free of nacreous pigment has a surface roughness of less than 1.2 micrometers.

10. The imaging element of claim 6 wherein said at least one layer of polyolefin substantially free of nacreous pigment is optical clear.

11. The imaging element of claim 1 wherein said nacreous pigment is present in amount between 100 and 1500 $mg/m^2$.

12. The imaging element of claim 1 wherein said nacreous pigment has a mean particle size of between 2 and 5 micrometers.

13. The imaging element of claim 1 wherein said nacreous pigment is present in an amount between 0.5 and 5% by weight of the layer it comprises.

14. The imaging element of claim 1 wherein said imaging element comprises a photographic layer.

15. The imaging element of claim 1 wherein said at least one layer of oriented polyolefin and nacreous pigment further comprises between 4 and 50 reflection planes.

16. The imaging element of claim 1 wherein said at least one layer of oriented polyolefin and nacreous pigment further comprises between 10 and 25 reflection planes.

* * * * *